United States Patent [19]

Mills

[11] Patent Number: 4,825,717

[45] Date of Patent: May 2, 1989

[54] ROCKER ARM OF THE CAM-FOLLOWER TYPE WITH RIBS

[75] Inventor: Jesse V. Mills, Toledo, Ohio

[73] Assignee: Henley Manufacturing Corporation, Hampton, N.H.

[21] Appl. No.: 243,627

[22] Filed: Sep. 12, 1988

[51] Int. Cl.[4] .................... B23P 15/00; F01L 1/18; G05G 1/04

[52] U.S. Cl. ........................ 74/519; 74/559; 29/156.4 R; 123/90.39; 123/90.44

[58] Field of Search ............ 74/519, 559, 523; 123/90.39, 90.41, 90.42, 90.44, 90.50; 29/156.4 R, 156.7 B

[56] References Cited

U.S. PATENT DOCUMENTS

| | | | |
|---|---|---|---|
| 4,430,783 | 2/1984 | Wherry | 123/90.39 |
| 4,624,223 | 11/1986 | Wherry et al. | 123/90.44 |
| 4,697,473 | 10/1987 | Patel | 74/559 X |
| 4,727,832 | 3/1988 | Miyamura et al. | 123/90.39 X |
| 4,738,231 | 8/1988 | Patel et al. | 123/90.39 X |
| 4,762,099 | 8/1988 | Fujii et al. | 123/90.44 |
| 4,768,467 | 9/1988 | Yamada et al. | 123/90.44 X |

FOREIGN PATENT DOCUMENTS

| | | | |
|---|---|---|---|
| 130497 | 6/1932 | Austria | 123/90.39 |
| 3342275 | 5/1985 | Fed. Rep. of Germany | 123/90.44 |
| 0112320 | 9/1978 | Japan | 123/90.44 |

Primary Examiner—Richard E. Moore
Assistant Examiner—Vinh Luong
Attorney, Agent, or Firm—Allen D. Gutchess

[57] ABSTRACT

A one-piece, cold-formed rocker arm of the cam-follower type is provided. The rocker arm includes a one-piece metal body cold formed from a metal blank and being of inverted U-shaped cross section throughout most of its length. The body has a top wall with depending, structurally-integral side walls. An intermediate, convex portion of the top wall has an opening extending therethrough with an axle extending between the side walls below the opening. A cam-contacting roller is rotatably mounted on the axle and has a circumferential surface exposed at the opening to engage a cam. The rocker arm body has a recess at one end portion to receive a lifter post and an additional recess at another end portion to receive an end of a valve stem. The one end portion of the body is wider than the remainder of the body. Ribs are formed at the lower edges of the body and extend along the intermediate portion of the body between the two end portions. The outer edges of the ribs do not extend beyond the side walls of the body at the one end portion thereof.

10 Claims, 2 Drawing Sheets

ROCKER ARM OF THE CAM-FOLLOWER TYPE WITH RIBS

This invention relates to a cold-formed, stamped rocker arm of the cam-follower type having ribs at lower edges thereof extending therealong an intermediate portion of the rocker arm.

Stamped rocker arms have several advantages over cast rocker arms. Stamped rocker arms are usually less expensive to manufacture than cast ones, particularly when produced in larger quantities so that die costs can be spread out more. In particular, stamped rocker arms are lighter in weight, an important advantage because lighter engines and vehicles result in better fuel economy and engine efficiency or, alternately, higher performance for the engine. Stamped rocker arms also have more visual appeal than their rough, cast counterparts. However, cast rocker arms tend to be more stiff than stamped ones. Rocker arms of the cam-follower type are pivoted at one end, pivotally moved at an intermediate portion by a cam, and move a valve stem at the other end. Deflection of the rocker arm between its end portions during operation is seemingly miniscule. However, the minute deflection has an affect on engine operation. Consequently, stiffness in a rocker arm is of substantial importance and absolute minimal deflection is desired for ultimate engine operation and efficiency.

The rocker arm in accordance with the invention is of the cam-follower type and is made by cold-forming operations, including stamping, coining, staking, back-packing. The rocker arm includes a one-piece metal body which is of interted U-shaped cross section throughout most of its length. The body has a top wall with two structurally-integral side walls depending therefrom. The rocker arm body includes a recess formed in a first end portion to receive an upper end of a lifter post upon which the rocker arm can pivot. A second end portion of the rocker arm has a second recess therein of rectangular cross section to receive an end of a valve stem. An intermediate portion of the top wall of the body is generally convex, facing upwardly away from the recesses. A middle part of the convex portion of the top wall has a rectangular opening extending therethrough with the length of longitudinal dimension of the rectangular opening being less than the length of the convex portion so that the convex portion extends beyond the rectangular opening. The width or transverse dimension of the rectangular opening is substantially equal to the width of the top wall so that the opening extends substantially completely from one side wall of the rocker arm body to the other.

A cam-contacting roller is rotatably carried by the rocker arm body and has a circumferential surface exposed at the rectangular opening to engage a cam. The cam-contacting roller is rotatably mounted on an axle carried by the side walls of the body below the rectangular opening. The roller is rotatably mounted on the axle through a multiplicity of needle bearings to provide minimal friction.

The first end portion of the rocker arm body is wider than the remainder of the body with the distance between the side walls at the first portion exceeding the distance between the side walls of the remainder of the body. Ribs are located along the lower edges of the side walls of the body at the intermediate portion and extend from the first end portion to the second end portion.

The transverse dimension or distance between the outer edges of the ribs does not exceed the maximum distance between the side walls at the first end portion of the body to avoid interference with other components of an engine with which the rocker arm is used. The ribs provide additional stiffness for the rocker arm which enable it to be comparable in stiffness to that of a cast rocker arm.

It is, therefoere, a principal object of the invention to provide a cold-formed rocker arm of the cam-follower type which is stiffer and deflects less during engine operation.

Another object of the invention is to provide a cold-formed rocker arm with longitudinally-extending ribs at lower edges of the side walls.

A further object of the invention is to provide a rocker arm of the cam-follower type having the advantages and features discussed above.

Many other objects and advantages of the invention will be apparent from the following detailed description of a preferred embodiment thereof, reference being made to the accompanying drawings, in which.

Figure 1:
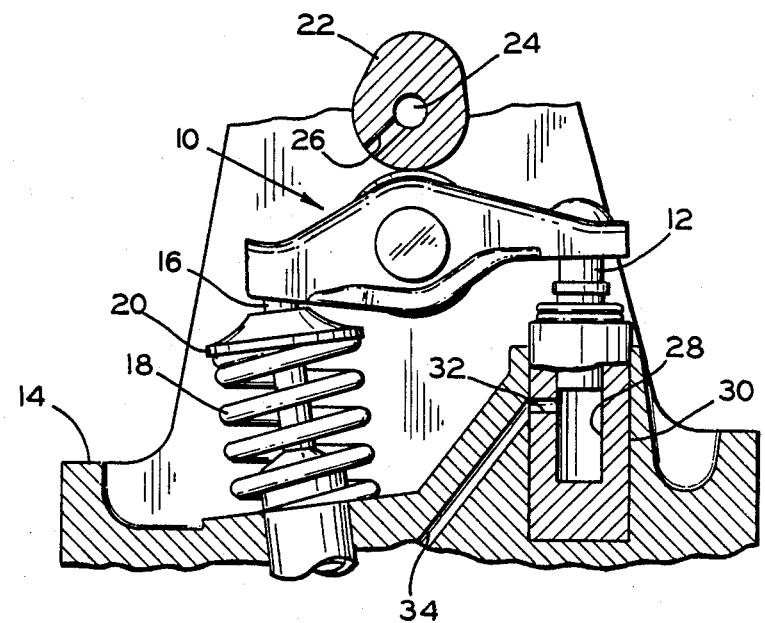
FIG. 1 is a somewhat schematic, fragmentary view in cross section, with portions in elevation, of valve-actuating mechanism including a rocker arm in accordance with the invention.

Referring particularly to FIG. 1, a rocker arm of the cam-follower type is indicated at 10 and has one end portion received on a rocker arm fulcrum or lifter post 12 extending upwardly from a cylinder head 14 of an internal combustion engine. The other end portion of the rocker arm 10 engages an upper end of a valve stem 16. The valve stem extends upwardly from the cylinder head 14 through a coiled compression spring 18 located therearound and which is seated against the cylinder head and against a retainer ring 20 mounted on the stem 16. An overhead cam 22 engages an intermediate portion of the rocker arm 10 to cause a valve located at the lower end of the valve stem 16 to open and close as the stem is moved longitudinally by the rocker arm 10. Oil or other lubricating fluid is supplied through a central passage 26 from which it flows to the intermediate surface of the rocker arm 10 for lubricating purposes.

The lifter post or fulcrum 12 is slidably carried in a chamber 28 of a cylinder 30. The post 12 is urged upwardly by fluid such as oil under pressure in the chamber 28 which is supplied through a small port 32 from a supply passage 34. The post 12 thereby can yield somewhat when the cam 22 rotates. In practice, the post 12 moves down slightly at the high lobe of the cam 22 to provide a zero lash adjustment for the rocker arm 10. The port 32 is of a size to provide for controlled leakage of the oil from the chamber 28 to control pressure of the oil therein. Oil can also be supplied from the passage 34 up to the intermediate surface of the rocker arm 10 for lubricating purposes.

Referring more particularly to FIGS. 2–6, the rocker arm 10 includes a one-piece, cold-formed metal body 36 which is preferably made by cold-forming operations, i.e. stamping, coining, staking, and back-packing. The body 36 is of generally inverted U-shaped configuration in cross section throughout most of its length. It includes a top wall 38 with structurally-integral, depending side walls 40 and 42. The side walls 40 and 42 flare outwardly at one end to form a wide first end portion 44 having a first, rounded recess 46 therein to receive the upper, rounded end of the lifter post 12. A lubricating or oil opening 48 formed through the upper wall 38 communicates with the rounded recess 46 and can provide a small reservoir for oil which is supplied to the recess 46 and to the lifter post 12.

A second end portion 50 of the body 36 has a second recess 52 therein which is of generally rectangular shape in transverse cross section. This recess is coined to maintain close tolerances when the recess receives the upper end of the valve stem 16. Ths cooperation prevents transverse or lateral motion of the rocker arm 10 during operation.

An intermediate portion 54 of the rocker arm body 36, between the end portions 44 and 50, is generally convex on top. A rectangular opening 56 is formed through the top wall 38 at the intermediate portion 54 with the width of transverse dimension of the rectangular opening 56 extending substantially between the inner surfaces of the side walls 40 and 42.

A cam-contacting roller 58 is positioned between the side walls 40 and 42 of the rocker arm 10 and has a circumferential surface extending slightly above the opening 56. The roller 58 has a central bore 60 which receives and contains a multiplicity of needle bearings 62. The needle bearings 62 rotatably support the roller 58 on an axle 64 which constitutes an inner race for the needle bearings. The axle 64 is received in two round holes 66 in the side walls 40 and 42 which are formed or pierced therein in axial alignment. Outer ends of the holes 66 are flared to receive flared ends of the axle 64. The flared ends of the axle can be formed by staking or by a spinning process. The cooperation of the flared openings and axle ends prevents longitudinal and rotational movement of the axle.

As discussed previously, it is important that a rocker arm, particularly of the cam-follower type, have a high degree of stiffness from one end to the other. This is important to achieve absolute minimal deflection for ultimate engine operation and efficiency. Toward this goal, the cold-formed rocker arm 10 is formed so that the side walls 40 and 42 at the intermediate portion 54 of the rocker arm body 36 are wide to achieve greater cross-sectional area of the rocker arm at the portion where the opening 56 is formed. Thus, the upper edges of the side walls at the opening slant upwardly and the lower edges at the same portion of the rocker arm slant downwardly so that the side walls are wider at the intermediate portion.

Figure 2:
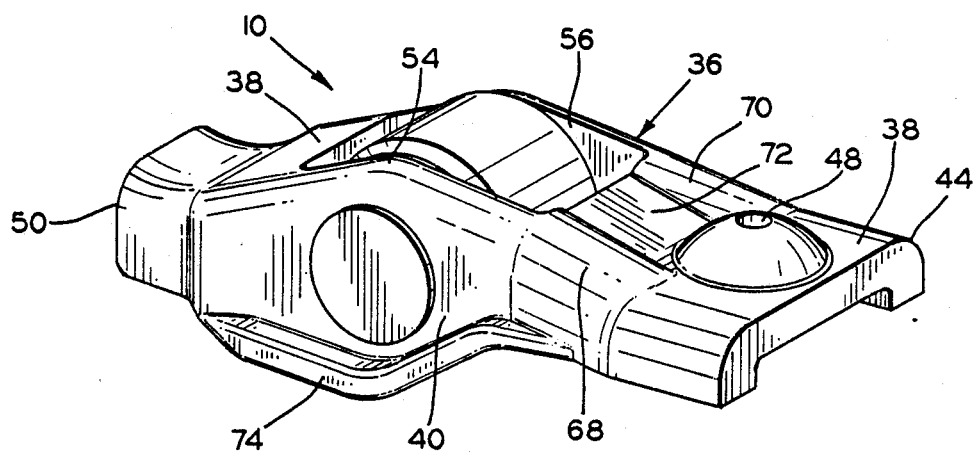
FIG. 2 is an enlarged view in perspective of the rocker arm of FIG. 1.
Figure 3:
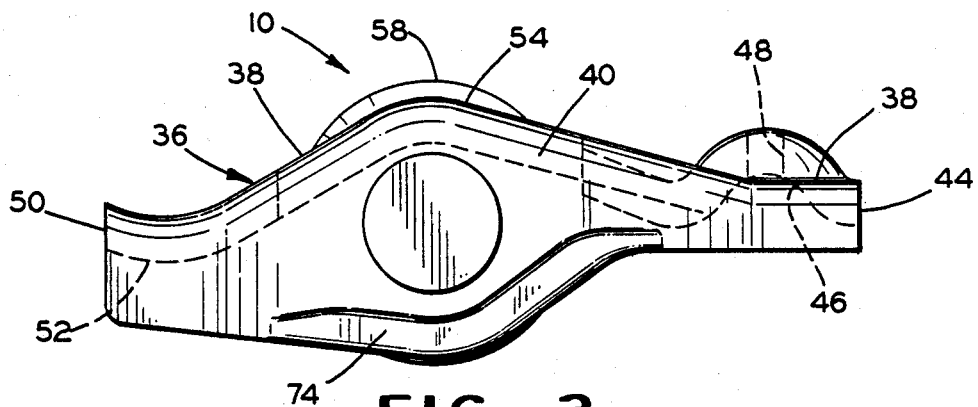
FIG. 3 is a side view in elevation of the rocker arm.
Figure 4:
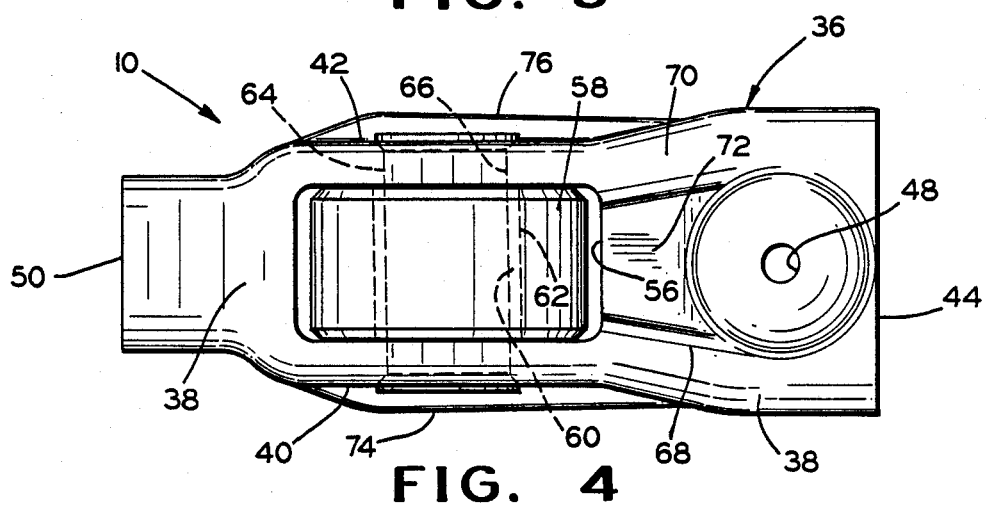
FIG. 4 is a top view of the rocker arm.
Figure 5:
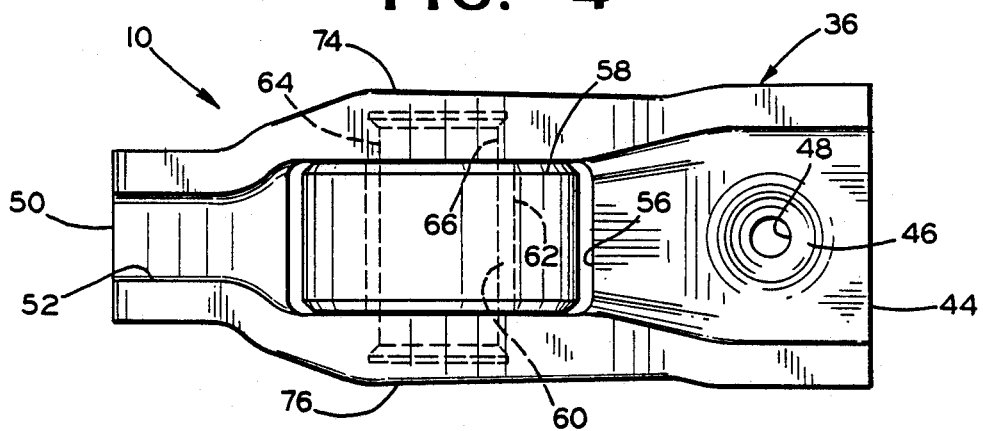
FIG. 5 is a bottom view of the rocker arm.
Figure 6:
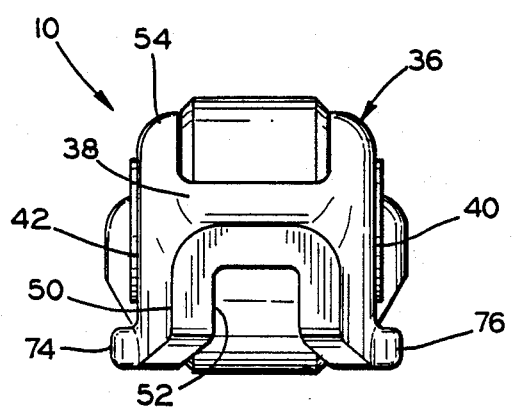
FIG. 6 is a left end view of the rocker arm.

The top wall 38 of the rocker arm body 36 also has ridges or elongate humps 68 and 70 formed therein from the one edge of the rectangular opening 56 toward the end 44 of the rocker arm, as best shown in FIG. 2 and 4. These again contribute to the overall stiffness of the rocker arm 10, particularly between the intermediate portion 54 and the end portion 44 thereof. The humps 68 and 70 are each of generally inverted U-shaped configuration in transverse cross section and are separated by a web 72 which slants downwardly somewhat from an end of the rectangluar opening 56 toward the end portion 44 of the rocker arm.

Ribs 74 and 76 are formed at the lower edges of the side walls 40 and 42. The ribs extend from a location near the first end portion 44 of the rocker arm to a location near the second end portion 50 of the rocker arm. The maximum dimension or distance between the outer extremities of the ribs 74 and 76 do not exceed the maximum dimension between the outer surfaces of the side walls 40 and 42 at the end portion 44. This is important to prevent interference of the rocker arm body with other components of an engine in which the rocker arm is installed. The ribs 74 and 76 contribute significantly to the stiffness of the rocker arm 10 and tend to overcome that disadvantage which cold-formed rocker arms otherwise have as compared to cast rocker arms.

Various modifications of the above-described embodiment of the invention will be apparent to those skilled in the art and it is to be understood that such modifications can be made without departing from the scope of the invention, if they are within the spirit and the tenor of the accompanying claims.

I claim:

1. A cold-formed rocker arm of the cam-follower type comprising an elongate, one-piece metal body of generally inverted U-shaped configuration in transverse cross section throughout most of its length, said body having a top wall and two side walls extending downwardly therefrom and structurally integral therewith, said metal body having a rounded recess in a first end portion thereof for receiving an end of a lifter post on which said rocker arm can pivot, said body having an additional recess in a second end portion thereof for receiving an end of a valve stem, an intermediate portion of said body having a generally convex portion facing upwardly, said top wall having an intermediate opening therein at the convex portion, said opening extending substantially the width of the top wall between the side walls at the intermediate portion and having a length which is less than the longitudinal extent of the convex portion, said side walls having axially-aligned openings therein below said intermediate opening, an axle extending through said side wall openings and affixed to said side walls to prevent longitudinal movement of said axle, a roller around said axle and extending substantially between said side walls of said body, bearing means around said axle and within a bore of said roller whereby said roller is rotatably mounted on said axle, a portion of a circumferential surface of said roller being exposed at said intermediate opening for engaging an overhead cam, said intermediate portion of said metal body having outwardly-extending ribs at lower edge portions of the side walls and extending from near said first end portion thereof to near said second end portion thereof.

2. A rocker arm according to claim 1 characterized by the side walls of said body at said first end portion thereof being spaced further apart than the side walls at the intermediate portion and at the second end portion, said ribs extending outwardly from the side walls a distance not exceeding the maximum distance between the side walls at said first end portion of said body.

3. A rocker arm according to claim 1 characterized by said top wall of said body having at least one upwardly-extending, elongate hump extending from an edge of said intermediate opening substantially to said first end portion of said body.

4. A rocker arm according to claim 1 characterized by said top wall of said body having two spaced, upwardly-extending, elongate humps extending from an edge of said intermediate opening substantially to said first end portion of said body.

5. A cold-formed rocker arm of the cam-follower type comprising an elongate, one-piece metal body of generally inverted U-shaped configuration in transverse cross section throughout most of its length, said body having a top wall and two side walls extending downwardly therefrom and structurally integral therewith, said body having means at a first end portion thereof for receiving a lifter post on which said rocker arm can pivot, said body having additional means at a second end portion thereof for receiving an end of a valve stem, said top wall having an intermediate opening therein at an intermediate portion of said body, said side walls having axially aligned openings therein below said intermediate opening, an axle extending through said side wall openings and affixed to said side walls to prevent longitudinal and rotational movement of said axle, a roller rotatably mounted on said axle, a portion of a circumferential surface of said roller being exposed at said intermediate opening for engaging an overhead cam, said intermediate portion of said body having outwardly-extending ribs at lower edge portions of the side walls and extending from near said first end portion to near said second end portion thereof.

6. A rocker arm according to claim 5 characterized by the side walls of said body at said first end portion thereof being spaced farther apart than the side walls at the intermediate portion and at the second end portion, said ribs extending outwardly from the side walls a distance not exceeding the maximum distance between the side walls at said first end portion of said body.

7. A rocker arm according to claim 5 characterized by said top wall of said body having at least one upwardly-extending, elongate hump extending from an edge of said intermediate opening substantially to said first end portion of said body.

8. A rocker arm according to claim 5 characterized by said top wall of said body having two spaced, upwardly-extending, elongate humps extending from an edge of said intermediate opening substantially to said first end portion of said body.

9. A cold-formed rocker arm of the cam-follower type comprising an elongate metal body having a top wall and two side walls extending downwardly therefrom and structurally integral therewith, said body having means at a first end portion for receiving a lifter post on which said rocker arm can pivot, said body having additional means at a second end portion for receiving a valve stem, an intermediate portion of said body having an intermediate opening therein, a roller rotatably carried by said body and having a circumferential portion exposed at said intermediate opening for engaging an overhead cam, said intermediate portion of said body having outwardly-extending ribs at lower edge portions of the side walls and extending from near said first end portion to near said second end portion, and said top wall having at least one elongate hump extending from an edge of said intermediate opening toward one of said end portions of said body.

10. A rocker arm according to claim 9 characterized by said side walls being substantially wider at said intermediate portion of said body than at said end portions.

* * * * *